United States Patent
Chang et al.

(10) Patent No.: US 11,393,274 B2
(45) Date of Patent: Jul. 19, 2022

(54) METHOD FOR DETECTING QUANTITY OF ITEMS, AND VENDING MACHINE

(71) Applicants: SHANDONG NEW BEIYANG INFORMATION TECHNOLOGY CO., LTD., Shandong (CN); WEIHAI NEW BEIYANG DIGITAL TECHNOLOGY CO., LTD., Shandong (CN)

(72) Inventors: Liangliang Chang, Shandong (CN); Xiangwei Chen, Shandong (CN); Xuqiang Dong, Shandong (CN); Yue Wang, Shandong (CN); Zhigang Xu, Shandong (CN); Tianxin Jiang, Shandong (CN)

(73) Assignees: SHANDONG NEW BEIYANG INFORMATION TECHNOLOGY CO., LTD., Shandong (CN); WEIHAI NEW BEIYANG DIGITAL TECHNOLOGY CO., LTD., Shandong (CN)

( * ) Notice: Subject to any disclaimer, the term of this patent is extended or adjusted under 35 U.S.C. 154(b) by 0 days.

(21) Appl. No.: 17/048,698

(22) PCT Filed: Apr. 17, 2019

(86) PCT No.: PCT/CN2019/082971
§ 371 (c)(1),
(2) Date: Oct. 19, 2020

(87) PCT Pub. No.: WO2019/201261
PCT Pub. Date: Oct. 24, 2019

(65) Prior Publication Data
US 2021/0158646 A1    May 27, 2021

(30) Foreign Application Priority Data

Apr. 19, 2018   (CN) .......................... 201810357046.7

(51) Int. Cl.
*G07F 9/02*   (2006.01)
*G07F 11/38*   (2006.01)
(Continued)

(52) U.S. Cl.
CPC .............. *G07F 9/02* (2013.01); *G07F 11/004* (2020.05); *G07F 11/165* (2013.01); *G07F 11/38* (2013.01)

(58) Field of Classification Search
CPC .... G07F 11/165; G07F 11/1653; G07F 9/026; G06Q 10/087; A47F 2010/025
(Continued)

(56) References Cited

U.S. PATENT DOCUMENTS 8,190,289 B2*   5/2012   Lockwood .............. G07F 9/002
                                                                700/236
2001/0048000 A1* 12/2001  Arai ........................ G07F 11/62
                                                                221/119
(Continued)

FOREIGN PATENT DOCUMENTS

| CN | 102488422 A | 6/2012 |
| CN | 107016786 A | 8/2017 |

(Continued)

OTHER PUBLICATIONS

International Search Report issued by the National Intellectual Property Administration, PRC (ISA/CN) China in connection with International Application No. PCT/CN2019/082971 dated Jul. 22, 2019.
(Continued)

*Primary Examiner* — Timothy R Waggoner
(74) *Attorney, Agent, or Firm* — Carter, DeLuca & Farrell LLP; George Likourezos

(57) ABSTRACT

Provided are a method for detecting quantity of items and a vending machine. The vending machine includes: an item column configured to temporarily store items, where the item column includes an outlet; a shielding member configured to shield or open the outlet of the item column; and a driving device configured to drive the items in the item column to move toward the outlet of the item column. The method includes: controlling the shielding member to shield
(Continued)

the outlet of the item column; driving the items in the item column to move until the items in the item column abut against each other; detecting a total length of all items in the item column; and calculating the quantity of items in the item column according to the total length of the all items and a length of a single item in the item column.

10 Claims, 6 Drawing Sheets

(51) Int. Cl.
  *G07F 11/16* (2006.01)
  *G07F 11/00* (2006.01)
(58) Field of Classification Search
  USPC .......................................................... 700/236
  See application file for complete search history.

(56) References Cited

U.S. PATENT DOCUMENTS

| | | | |
|---|---|---|---|
| 2006/0208851 A1* | 9/2006 | Tsunoda | G07F 11/165 340/5.9 |
| 2011/0055103 A1* | 3/2011 | Swafford, Jr | A47F 1/126 705/345 |
| 2015/0310694 A1* | 10/2015 | Will | G07F 11/165 221/13 |
| 2017/0273477 A1* | 9/2017 | Mercier | A47F 1/126 |
| 2018/0005173 A1 | 1/2018 | Elazary et al. | |
| 2020/0043273 A1* | 2/2020 | Vazquez | G07F 11/42 |

FOREIGN PATENT DOCUMENTS

| | | |
|---|---|---|
| CN | 107301730 A | 10/2017 |
| CN | 207123895 U | 3/2018 |
| CN | 207123898 U | 3/2018 |
| CN | 109427134 A | 3/2019 |
| JP | H07249161 A | 9/1995 |
| JP | H11242777 A | 9/1999 |
| WO | 2014141048 A1 | 9/2014 |

OTHER PUBLICATIONS

European Search Report issued by the European Patent Office in connection with International Application No. PCT/CN2019082971 dated Aug. 21, 2021.

* cited by examiner

METHOD FOR DETECTING QUANTITY OF ITEMS, AND VENDING MACHINE

This application claims priority to Chinese Patent Application No. 201810357046.7 filed with the CNIPA on Apr. 19, 2018, disclosure of which is incorporated herein by reference in its entirety.

TECHNICAL FIELD

The present application relates to the technical field of vending machines, for example, a method for detecting quantity of items and a vending machine.

BACKGROUND

The vending machine (VEM) is a machine capable of automatically providing items with the paying of the user. The vending machine is a commonly used device of commercial automation, which is not restricted by time and place, and can save manpower and facilitate trades. The vending machine is a brand new commercial retail form and is also known as a 24-hour micro-supermarket. At present, four types of vending machines are commonly seen in domestic: a beverage vending machine, a food vending machine, an integrated vending machine and a cosmetic vending machine. The above four common vending machines all include a cabinet, an outlet arranged on a surface of a machine body and a shelf arranged inside the machine body. The shelf is divided into multiple item columns for temporarily storing the items, and the item columns each are provided with a push plate. After the purchaser confirms items to be purchased, the push plate is able to deliver the items on the shelf to the outlet along a guiding member so as to implement the purpose of automatically selling the items.

The vending machine provided in the related art is able to implement self-service, and is also able to automatically detect and identify the quantity of the items in the item column. However, the vending machine provided by the related art is error-prone when detecting and identifying the quantity of the items in the item column. As a result, the inventory of the quantity of items in the item column is inaccurate, which is not conducive to the accurate replenishment of the vending machine.

SUMMARY

The present application provides a method for detecting quantity of items, which can improve the accuracy of detecting the quantity of items in an item column, and avoid detection errors.

The present application provides a vending machine, which can improve the accuracy of detecting the quantity of items in an item column, and avoid detection errors.

Embodiments of the present application are implemented through solutions described below.

Provided is a method for detecting quantity of items, applied to a vending machine. The vending machine includes: an item column configured to temporarily store items, where the item column includes an outlet; a shielding member configured to shield or open the outlet of the item column; and a driving device configured to drive the items in the item column to move to the outlet of the item column. The method includes: controlling the shielding member to shield the outlet of the item column; driving the items in the item column to move until the items in the item column abut against each other; detecting a total length of all items in the item column; and calculating the quantity of items in the item column according to the total length and a length of a single item in the item column.

Provided is a vending machine, including: an item column, a driving device, a shielding member, a shielding member driving mechanism, a length measuring device and a control device. The item column is configured to temporarily store items, and the item column includes an outlet. The driving device is configured to drive the items in the item column to move toward the outlet of the item column. The shielding member is configured to open or shield the outlet of the item column. The shielding member driving mechanism is configured to drive the shielding member to move The length measuring device is configured to detect a total length of the items in the item column. The driving device, the shielding member driving mechanism and the length measuring device are all electrically connected to the control device. And the control device is configured to control the shielding member driving mechanism so as to drive the shielding member to shield the outlet of the item column, control the driving device so as to drive the items in the item column to move until the items in the item column abut against each other, detect the total length of all items in the item column through the length measuring device, and calculate quantity of the items in the item column according to the total length of the all items and a length of a single item in the item column.

BRIEF DESCRIPTION OF DRAWINGS

The drawings used in description of the embodiments will be briefly described below.

Apparently, the subsequent drawings only illustrate part of embodiments of the present disclosure, and those of ordinary skill in the art may obtain other accompanying drawings based on the accompanying drawings described below on the premise that no creative work is done.

Figure 1:
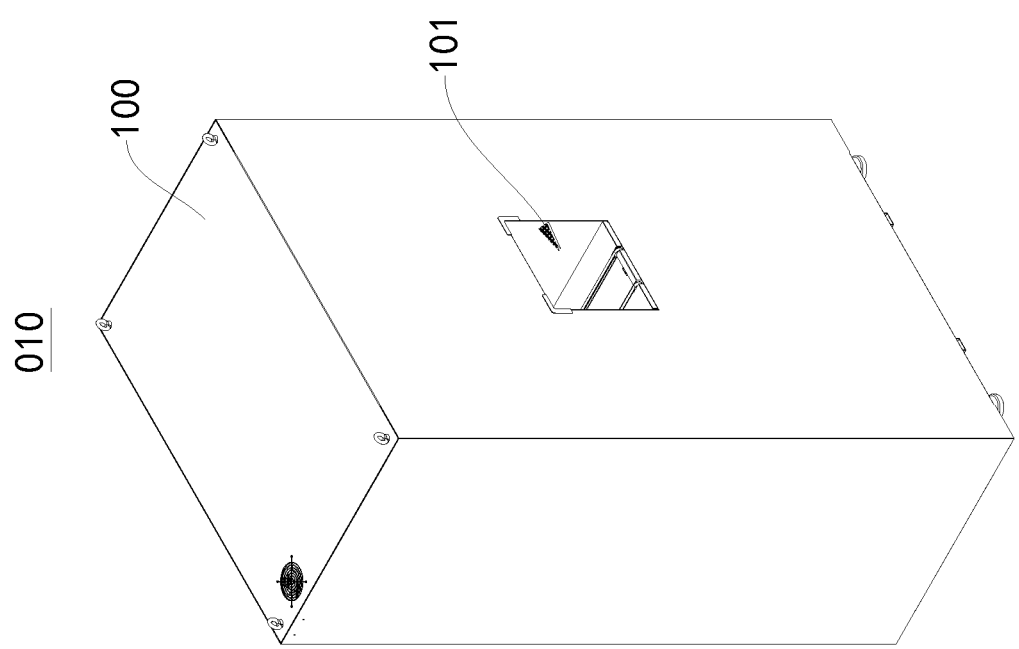
FIG. 1 is a schematic structural diagram of a vending machine according to an embodiment of the present application.

In the drawings: 010—vending machine; 100—cabinet body; 101—take-out opening; 200—item column; 210—outlet of item column; 300—driving device; 400—hopper; 410—hopper driving mechanism; 411—control device; 412—length measuring device; 413—shielding driving mechanism; 500—shielding member; 310—push plate; 311—gear; 312—rack; 313—motor; 320—pressure sensor; 330—second distance measuring sensor.

DETAILED DESCRIPTION

Solutions of embodiments of the present application will be clearly and completely described below with reference to the drawings. Apparently, the described embodiments are part, not all, of embodiments of the present application.

Therefore, the following detailed description of the embodiments of the present application is not intended to limit the scope of the present application, but merely illustrates part of embodiments of the present application. Based on the embodiments described herein, all other embodiments obtained by those skilled in the art without creative work are within the scope of the present application.

It is to be noted that if not in collision, the embodiments and features therein in the present application can be combined with the solutions.

It is to be noted that similar reference numerals and letters indicate similar items in the subsequent drawings, and therefore, once a particular item is defined in a drawing, the item needs no more definition and explanation in subsequent drawings.

Figure 2:
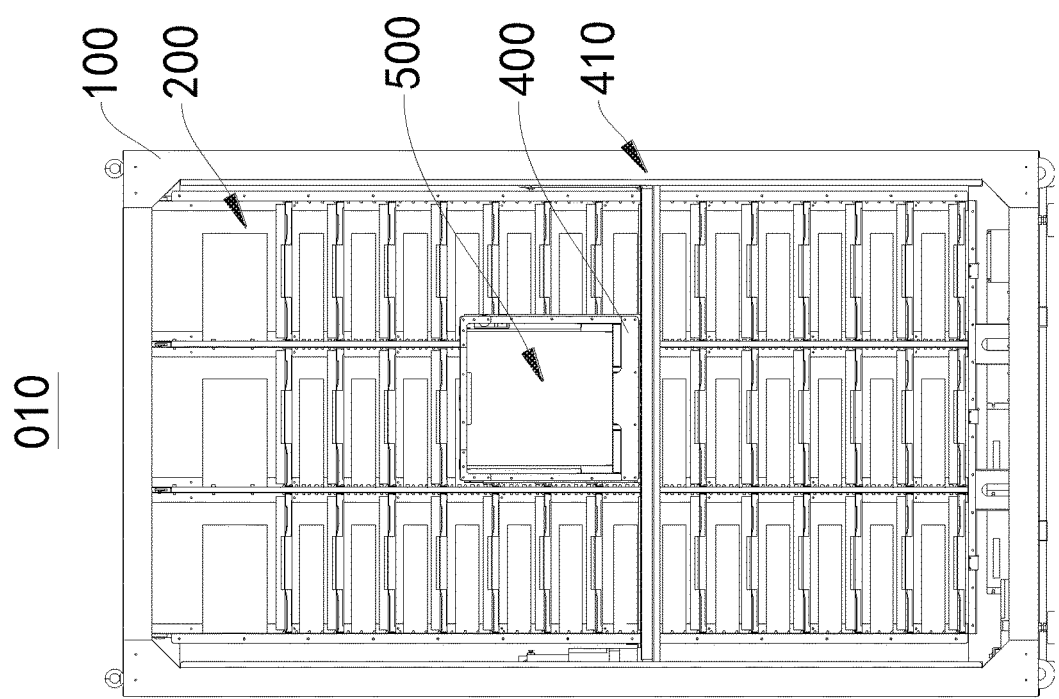
FIG. 2 is a section view of a vending machine according to an embodiment of the present application.
Figure 3:
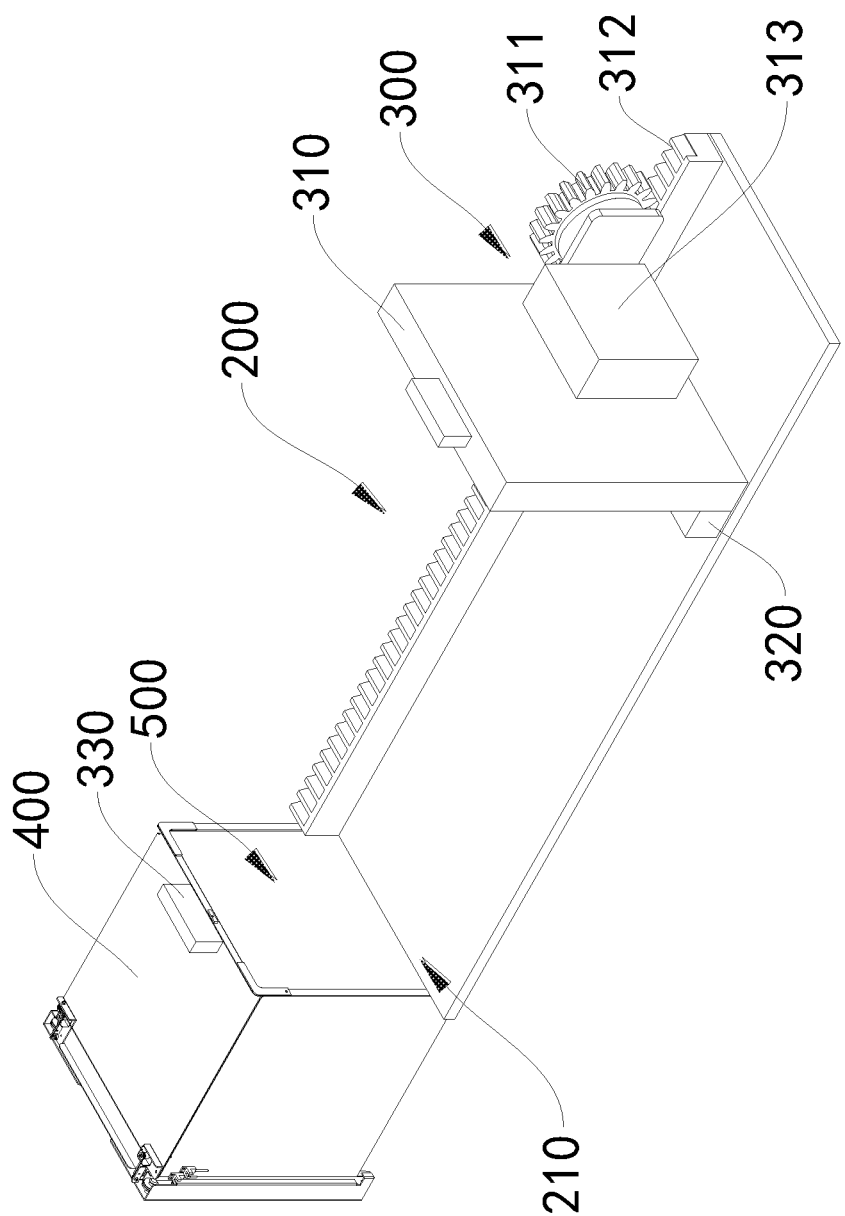
FIG. 3 is a schematic structural diagram of a hopper and an item column according to an embodiment of the present application.
Figure 4:
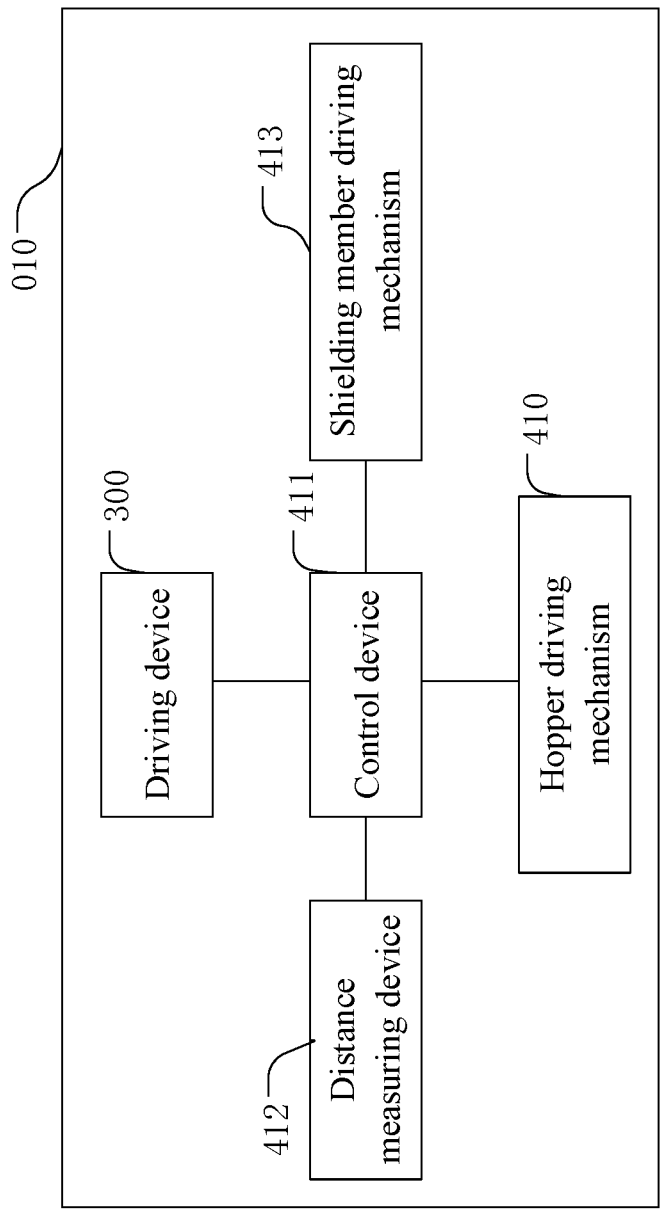
FIG. 4 is a block diagram of a vending machine according to an embodiment of the present application.

FIG. 1 is a schematic structural diagram of a vending machine 010 according to an embodiment of the present application. FIG. 2 is a section view of a vending machine 010 according to an embodiment of the present application. FIG. 3 is a schematic structural diagram of a hopper 400 and an item column 200 according to an embodiment of the present application. FIG. 4 is a block diagram of a vending machine 010 according to an embodiment of the present application. Referring to FIGS. 1 to 4, the present application provides a vending machine 010, including a cabinet body 100, an item column 200 arranged in the cabinet body 100, a driving device 300, a hopper 400, a hopper driving mechanism 410, a shielding member 500, a shielding member driving mechanism 413, a length measuring device 412 and a control device 411. A surface of the cabinet body 100 is provided with a take-out opening 101 for the items. The item column 200 is configured to temporarily store the items, and the item column 200 has an outlet 210, the items in the item column 200 can be delivered out through the outlet 210 of the item column 200. The driving device 300 is configured to drive the items in the item column 200 to move towards the outlet 210 of the item column 200. The driving device 300 may be arranged in the item column 200. The hopper 400 is configured to deliver the items discharged from the outlet 210 of the item column 200. The hopper driving mechanism 410 is configured to drive the hopper 400 to move between the outlet 210 and the take-out opening 101. For example, the hopper driving mechanism 410 drives the hopper 400 to move to the outlet 210 of the item column 200 so that the hopper 400 receives the items discharged from the outlet 210 of the item column 200, and the hopper driving mechanism 410 drives the hopper 400 to move to the take-out opening 101 so that the hopper 400 delivers the items to the take-out opening 101. The shielding member 500 may move relative to the outlet 210 of the item column 200, thereby opening or shielding the outlet 210 of the item column 200. The shielding member 500 may partially or completely shield the outlet 210 of the item column 200. The shielding member driving mechanism 413 is drivingly connected to the shielding member 500. Under the driving of the shielding member driving mechanism 413, the shielding member 500 moves relative to the outlet 210 of the item column 200 so as to open or shield the outlet 210 of the item column 200. In a case where the shielding member 500 shields the outlet 210 of the item column 200 and the items in the item column 200 are driven by the driving device 300 to move toward the outlet 210 of the item column 200, since the outlet 210 of the item column 200 is shielded, the items in the item column 200 cannot be delivered out through the outlet 210 of the item column 200, so the items of the item column 200 abut against each other; and the length measuring device 412 can be used for measuring a total length of the items in the item column 200. Referring to FIG. 4, the driving device 300, the hopper driving mechanism 410, the shielding member driving mechanism 413, and the length measuring device 412 are all electrically connected to the control device 411, and the control device 411 controls the driving device 300, the hopper driving mechanism 410, the shielding member driving mechanism 413 and the length measuring device 412 to operate, that is, the control device 411 is configured to control the shielding member driving mechanism 413 to drive the shielding member 500 to shield the outlet 210 of the item column 200, control the driving device 300 to drive the items in the item column 200 to move until the items in the item column 200 abut against each other, control the length measuring device 412 to detect the total length of all items in the item column 200, and calculate the quantity of items in the item column 200 according to the detected total length of all items in the item column 200 and a length of a single item in the item column 200.

In the present application, the shielding member 500 for shielding the outlet 210 of the item column 200 is able to prevent the items from being delivered out of the item column 200 through the outlet 210 of the item column 200 when the driving device 300 drives the items in the item column 200 to move toward the outlet 210 of the item column 200, so that the items in the item column 200 are able to abut against each other. Therefore, it is possible to avoid the inaccurate detection of the total length of the items in the item column 200 due to gaps between adjacent items, which reduces errors of detecting the total length of the items in the item column 200 and improves the detection accuracy, so that the quantity of items in the item column 200 can be calculated more accurate, and more accurate replenishment and other operations can be performed according to the calculated quantity of items in the item column 200.

Referring to FIG. 3, the driving device 300 in this embodiment includes a push plate 310. The push plate 310 may be arranged in the item column 200, and the push plate 310 may be configured to push the items in the item column 200 to move toward the outlet 210 of the item column 200. For example, the control device 411 may be configured to control the push plate 310 to push the items in the item column 200 to move toward the outlet 210 of the item column 200, and detect whether or not the items in the item column 200 abut against each other during the push plate 310 pushing the items in the item column 200 to move toward the outlet 210 of the item column 200. In response to detecting the items in the item column 200 abut against each other, the control device 411 is configured to control the push plate 310 to stop pushing the items in the item column 200 to move. When the push plate 310 pushes the items in the item column 200 to move, the detecting whether or not the items in the item column 200 abut against each other, on one hand, may ensure that the items in the item column 200 abut against each other, that is, no gap exists between adjacent items, thereby ensuring the detection accuracy of the total length of the items in the item column 200. On the other hand, the detecting whether or not the items in the item column 200 abut against each other may cease the control of the push plate 310 to push the items in the item column 200 to move in time so as to prevent the appearance deform or damage of the items caused by the oversqueezing of the push plate 310 on the items in the item column 200.

Figure 5:
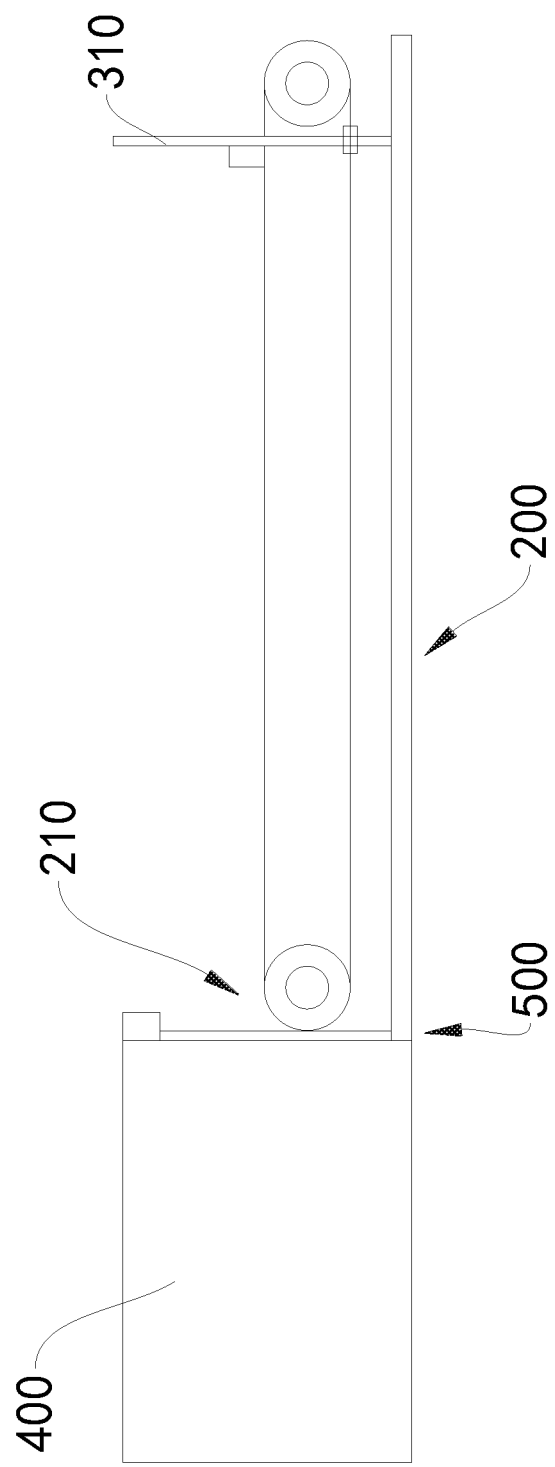
FIG. 5 is a schematic structural diagram of a hopper and an item column according to another embodiment of the present application.

It should be noted that the driving device 300 may also include a push plate driving mechanism (not shown in the figure). The push plate driving mechanism may be configured to drive the push plate 310 to move. The push plate driving mechanism in this embodiment includes a gear 311 and a rack 312 that cooperate with each other. The push plate driving mechanism also includes a motor 313 that drives the gear 311 to rotate. The gear 311 is connected to the push plate 310, that is, the motor 313 may drive the gear 311 to move along the rack 312, and the push plate 310 moves along with the gear 311. FIG. 5 is a schematic structural diagram of the hopper 400 and the item column 200 in another embodiment of the present application. Referring to FIG. 5, the driving mechanism may also be a belt transmission mechanism, and the push plate 310 may be arranged on a conveyor belt of the belt transmission mechanism.

Referring to FIG. 3, the vending machine 010 of this embodiment further includes a pressure sensor 320, and in this embodiment, the pressure sensor 320 is arranged on the push plate 310. When the push plate 310 pushes the items in the item column 200 to move toward the outlet 210 of the item column 200, the pressure sensor 320 is in contact with the items in the item column 200, and the pressure sensor 320 outputs a pressure value, i.e., outputting a value of the pressure on the push plate 310 during the push plate 310 pushing the items to move. The control device 411 is configured to detect the pressure value output by the pressure sensor 320 arranged on the push plate 310 during the push plate 310 being controlled to push the items in the item column 200 toward the outlet 210 of the item column 200, that is, the value of the pressure on the push plate 310 during the push plate 310 pushing the items to move. In a case where the pressure value output by the pressure sensor 320 arranged on the push plate 310 reaches a preset pressure value, it may be determined that the items in the item column 200 abut against each other, that is, in condition that the pressure value output by the pressure sensor 320 reaches the preset pressure value, no gap exists between adjacent items in the item column 200. In an embodiment, the pressure sensor 320 may also be arranged on the shielding member 500. When the push plate 310 pushes the items in the item column 200 to move toward the outlet 210 of the item column 200, the items in the item column 200 are in contact with the pressure sensor 320; the pressure sensor 320 outputs a pressure value, i.e., outputting a pressure value on the shielding member 500 during the push plate 310 pushing the items to move, and the control device 411 is able to detect the pressure value output by the pressure sensor 320 arranged on the shielding member 500 during the push plate 310 being controlled to push the items in the item column 200 to move toward the outlet 210 of the item column 200, that is, the value of the pressure on the shielding member 500. In condition that the pressure value output by the pressure sensor 320 arranged on the shielding member 500 reaches a preset pressure value, it may be determined that the items in the item column 200 abut against each other, that is, in condition that the pressure value output by the pressure sensor 320 reaches the preset pressure value, no gap exists between adjacent items in the item column 200.

In the vending machine provided by this embodiment of the present application, when the quantity of items in the item column is counted, the control device may be used for controlling the shielding member to shield the outlet of the item column and controlling the driving device to drive the items in the item column to move toward the outlet of the item column. The shielding member shields the outlet of the item column, so that the items in the item column can abut against each other during the items in the item column being driven to move, thereby avoiding gaps existing between the items when measuring the total length of the items in the item column. Therefore, the detection accuracy of the total length of the items in the item column is improved, and the accuracy of calculating the quantity of items in the item column according to the total length of the all items and the length of the single item is further improved.

In an embodiment, the vending machine 010 may also include a displacement sensor (not shown in the figure). During the push plate 310 pushing the items in the item column 200 toward the outlet 210 of the item column 200, the displacement sensor outputs a displacement signal responding to a displacement of the push plate 310. The control device 411 is configured to detect the displacement signal output by the displacement sensor during the push plate 310 being controlled to push the items in the item column 200 to move toward the outlet 210 of the item column 200, that is, to detect the displacement of the push plate 310. When the displacement of the push plate 310 no longer changes, it is determined that the items in the item column 200 abut against each other. In this embodiment, the displacement sensor may be arranged on the push plate 310. In another embodiment, the displacement sensor may also be arranged on the driving mechanism. For example, the displacement sensor may be arranged on the gear 311 or on the conveyor belt of the belt transmission mechanism.

In an embodiment, the vending machine 010 may further include a first distance measuring sensor (not shown in the figure), and the first distance measuring sensor may be arranged on the push plate 310 or the shielding member 500. During the push plate 310 pushing the items of the item column 200 toward the outlet 210 of the item column 200, the first distance measuring sensor is able to output a distance signal responding to a distance between the push plate 310 and the shielding member 500, and the control device 411 is configured to detect the distance signal output by the first distance measuring sensor during the push plate 310 pushing the items of the item column 200 toward the outlet 210 of the item column 200, that is, to detect the distance between the push plate 310 and the shielding member 500. When the distance between the push plate 310 and the shielding member 500 no longer changes, it is determined that the items in the item column 200 abut against each other.

The shielding member 500 in this embodiment is arranged at the hopper 400, and the control device 411 is further configured to control the hopper driving mechanism 410 to drive the hopper 400 to move to the outlet 210 of the item column 200 before controlling the shielding member driving mechanism 413 to drive the shielding member 500 to shield the outlet 210 of the item column 200, and then control the shielding member 500 to shield the outlet 210 of the item column 200. For example, the shielding member 500 may simultaneously shield the outlet 210 of the item column 200 and an inlet of the hopper 400. In an embodiment, the shielding member 500 may also be arranged at the outlet 210 of the item column 200 (for example, the shielding member 500 is arranged at the outlet 210 of the item column 200 and is fixedly connected to a side plate of the item column 200), and be able to shield or open the outlet 210 of the item column 200.

It should be noted that the shielding member 500 in this embodiment includes a shielding plate, and the shielding plate may be driven to move up and down or move left and right by the shielding member drive mechanism 413, so that the outlet 210 of the item column 200 may be shielded or opened by the shielding plate. In an embodiment, the shielding member 500 may also include a shielding rod and a shielding net, etc.

Referring to FIG. 3, the length measuring device 412 of this embodiment includes a second distance measuring sensor 330. The second distance measuring sensor 330 is arranged on the hopper 400. The control device 411 is configured to detect the total length of all items in the item column 200 through the second distance measuring sensor 330. The control device 411 is also configured to control the hopper driving mechanism 410 to drive the hopper 400 to the outlet 210 of the item column 200 before the total length of all items in the item column 200 are detected through the second distance measuring sensor 330, then detect the total length of all items in the item column 200 through the second distance measuring sensor 330 after the driving device 300 drives the items in the item column 200 to abut against each other, and calculate the quantity of items in the item column 200 according to the total length of the all items and a preset length of a single item.

In an embodiment, the second distance measuring sensor 330 is able to emit a detection beam, and the push plate 310 can reflect the detection beam. For example, the second distance measuring sensor 330 is able to detect a distance between the second distance measuring sensor 330 and the push plate 310. In a case where the items in the item column 200 are pushed by the push plate 310 to the outlet 210 of the item column 200, and the items in the item column 200 abut against each other, the distance between the second distance measuring sensor 330 and the push plate 310 detected by the second distance measuring sensor 330 is the total length of all items in the item column 200. It should be noted that the distance between the second distance measuring sensor 330 and the push plate 310 detected by the second distance measuring sensor 330 in this embodiment may also be considered as the distance between the push plate 310 and the hopper 400. In an embodiment, the push plate 310 is also provided with a reflecting part, and the reflecting part may be configured to reflect the detection beam emitted by the second distance measuring sensor 330, so that it may be more convenient for the second distance measuring sensor 330 to detect the distance between the second distance measuring sensor 330 and the push plate 310.

In an embodiment, the second distance measuring sensor 330 may also be arranged at the shielding member 500, the push plate 310 or the outlet 210 of the item column 200 (for example, at the outlet 210 of the item column 200 and be fixedly connected to the side plate of the item column 200), etc. In an embodiment, a reflecting part may be provided at a position opposite to the second distance measuring sensor 330. In other embodiments, in a case where the first distance measuring sensor used for detecting whether or not the items in the item column 200 abut against each other and the second distance measuring sensor 330 used for detecting the total length of all items in the item column 200 are both arranged on the push plate 310 or the shielding member 500, one distance measuring sensor may be used for detecting whether or not the items in the item column 200 abut against each other and detecting the total length of all items in the item column 200.

For the vending machine 010 provided in this embodiment of the present application, when the quantity of items in the item column 200 is counted, the control device 411 can be used for controlling the shielding member 500 to shield the outlet 210 of the item column 200, controlling the driving device 300 to drive the items in the item column 200 to move toward the outlet 210 of the item column 200 until the items in the item column 200 abut against each other, then detecting the total length of all items in the item column 200 by the second distance measuring sensor 330, and finally calculating the quantity of items in the item column 200 according to the detected total length of all items and the length of a single item. The vending machine 010 of this application enables the items in the item column 200 to abut against each other before the total length of all items in the item column 200 is detected, improving the accuracy of detecting the total length of all items in the item column 200, thereby further improving the accuracy of detecting the quantity of items.

Figure 6:
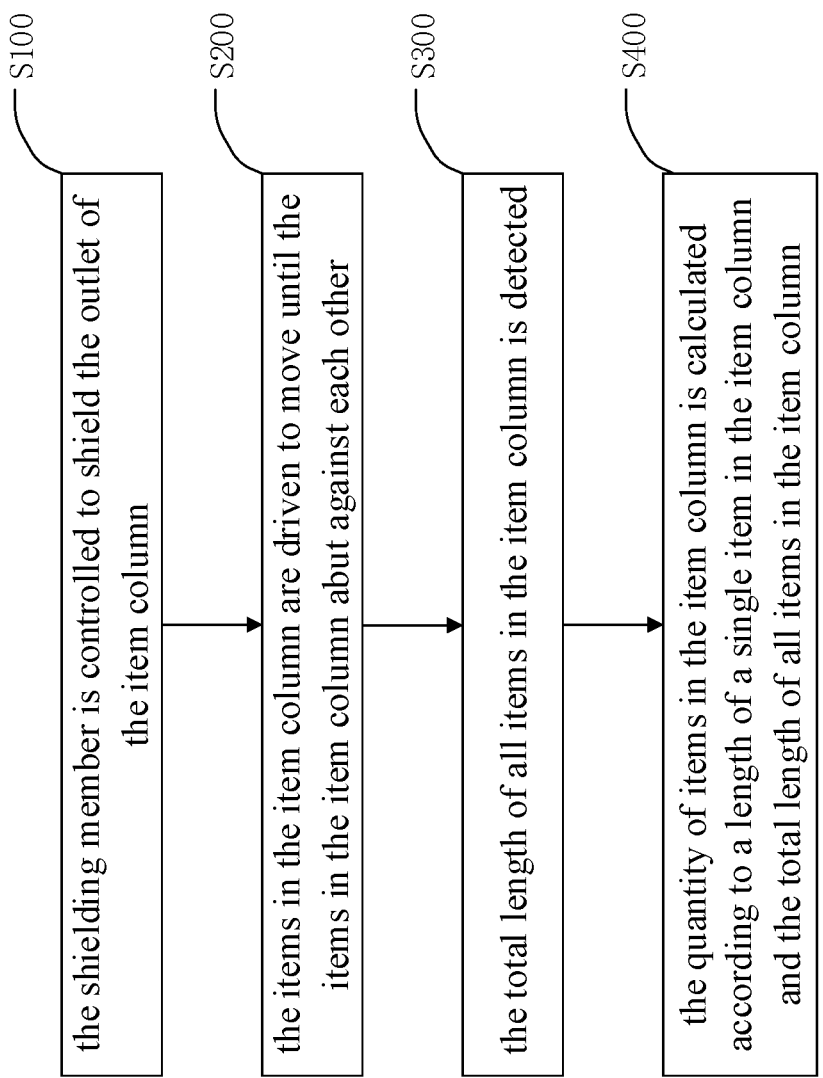
FIG. 6 is a flowchart of a method for detecting quantity of items according to an embodiment of the present application.

FIG. 6 is a flowchart of a method for detecting quantity of items according to an embodiment of the present application. Referring to FIG. 6, the present application provides a method for detecting the quantity of items. The method may be used for the vending machine 010 provided in the embodiment of the present application to count the quantity of items in the item column 200. The method for detecting the quantity of items in the present application includes: steps S100 to S400.

In step S100, the shielding member is controlled to shield the outlet of the item column.

The shielding member 500 of the embodiment of the present application is arranged at the hopper 400, and the controlling the shielding member 500 to shield the outlet 210 of the item column 200 may include: driving the hopper 400 to the outlet 210 of the item column 200 and then controlling the shielding member 500 arranged at the hopper 400 to shield the outlet 210 of the item column 200. For example, the hopper driving mechanism 410 may be controlled by the control device 411 to drive the hopper 400 to move to the outlet 210 of the item column 200, and then the shielding member driving mechanism 413 is controlled by the control device 411 to drive the shielding member 500 arranged at the hopper 400 to shield the outlet 210 of the item column 200.

In an embodiment, the shielding member 500 is arranged at the outlet 210 of the item column 200 (for example, the shielding member 500 is arranged at the outlet 210 of the item column 200 and is fixedly connected to the side plate of the item column 200), and the control device 411 may control the shielding member driving mechanism 413 to drive the shielding member 500 arranged at the outlet 210 of the item column 200 to shield the outlet 210 of the item column 200.

In step S200, the items in the item column 200 are driven to move until the items in the item column 200 abut against each other.

In the embodiment of the present application, the driving the items in the item column 200 to move until the items in the item column 200 abut against each other may include: controlling the push plate 310 of the driving device 300 to push the items in the item column 200 to move toward the outlet 210 of the item column 200, detecting whether or not the items in the item column 200 abut against each other during the pushing plate 310 pushing the items in the item column 200 to move, and controlling the push plate 310 to stop pushing the items in the item column 200 to move when it is detected that the items in the item column 200 abut against each other.

In an embodiment, the detecting whether or not the items in the item column 200 abut against each other during the pushing plate 310 pushing the items in the item column 200 to move may include: detecting a value of the pressure on the push plate 310, and in a case where the value of the pressure on the push plate 310 reaches a preset pressure value, determining that the items in the item column 200 abut against each other. In an embodiment, the control device 411 of the vending machine 010 detects the pressure value output by the pressure sensor 320 arranged on the push plate 310, and the control device 411 determines whether the pressure value output by the pressure sensor 320 reaches the preset pressure value. In an embodiment, the pressure sensor 320 may also be arranged on the shielding member 500, and the detecting whether or not the items in the item column 200 abut against each other during the push plate 310 pushing the items in the item column 200 to move may include: detecting a value of the pressure on the push plate 500, and in a case where the value of the pressure on the push plate 500 reaches a preset pressure value, determining that the items in the item column 200 abut against each other. In an embodiment, the control device 411 of the vending machine 010 detects the pressure value output by the pressure sensor 320 arranged on the shielding member 500, and the control device 411 determines whether or not the pressure value output by the pressure sensor 320 reaches the preset pressure value.

In an embodiment, whether or not the items in the item column 200 abut against each other may also be determined through detecting a displacement of the push plate 310 moving in the item column 200. In a case where the displacement of the push plate 310 no longer changes, it is determined that the items in the item column 200 abut against each other. For example, the control device 411 of the vending machine 010 detects a displacement signal output by a displacement sensor arranged on the push plate 310, i.e., detecting the displacement of the push plate 310. In a case where the displacement of the push plate 310 no longer changes, it is determined that the items in the item column 200 abut against each other. In an embodiment, the displacement sensor may be arranged on the driving mechanism of the driving device 300. For example, the displacement sensor may be arranged on the gear 311 or on a conveyor belt of a belt transmission mechanism. And the displacement sensor may output the displacement signal responding to a displacement of the push plate 310.

In an embodiment, the distance between the push plate 310 and the shielding member 500 may be detected to determine whether or not the items in the item column 200 abut against each other. In a case where the distance between the push plate 310 and the shielding member 500 no longer changes, it is determined that the items in the item column 200 abut against each other. For example, a first distance measuring sensor may be arranged on the push plate 310 or the shielding member 500, and the first distance measuring sensor may output a distance signal responding to the distance between the push plate 310 and the shielding member 500. The control device 411 of the vending machine 010 can be configured to detect the distance signal output by the first distance measuring sensor during the push plate 310 pushing the items in the item column 200 to move toward the outlet 210 of the item column 200, i.e., detecting the distance between the push plate 310 and the shielding member 500. In the case where the distance between the push plate 310 and the shielding member 500 no longer changes, it is determined that the items in the item column 200 abut against each other.

In step S300, the total length of all items in the item column is detected.

The detecting the total length of all items in the item column 200 may include: driving the hopper 400 to the outlet 210 of the item column 200, and detecting the total length of all items in the item column 200 by the distance measuring sensor arranged on the hopper 400, for example, the second distance measuring sensor 330 provided in the embodiment of the present application detects the total length of all items in the item column 200.

In an embodiment, the second distance measuring sensor is able to emit a detection beam, the push plate 310 may reflect the detection beam, and the second distance measuring sensor may detect the distance between the second distance measuring sensor and the push plate 310. When the items in the item column 200 are pushed by the push plate 310 to the outlet 210 of the item column 200 and the items in the item column 200 abut against each other, the distance between the second distance measuring sensor 330 and the push plate 310 detected by the second distance measuring sensor is the total length of all items in the item column 200.

In an embodiment, the second distance measuring sensor may also be arranged at the shielding member 500, the push plate 310, the outlet 210 of the item column 200 or the inlet of the hopper 400, etc. In other embodiments, in a case where the first distance measuring sensor used for detecting whether or not the items in the item column 200 abut against each other and the second distance measuring sensor used for detecting the total length of all items in the item column 200 are both arranged on the push plate 310 or the shielding member 500, one distance measuring sensor may be used for detecting whether or not the items in the item column 200 abut against each other and detecting the total length of all items in the item column 200.

In step S400, the quantity of items in the item column is calculated according to a length of a single item in the item column and the total length of all items in the item column.

In this application, before detecting the quantity of items in the item column 200, the control device 411 first acquires a pre-stored length of a single item placed in the item column 200, and then calculates the quantity of items in the item column 200 according to the length of the single item and the total length of the items in the item column 200 acquired in step S300.

The method for detecting the quantity of items provided in the present application may be applied to the detection of the quantity of items in the item column 200 in the vending machine 010. During detecting the quantity of items in the item column 200 by this method, the shielding member 500 firstly shields the outlet 210 of the item column 200, and then the driving device 300 drives the items in the item column 200 to move toward the outlet 210 of the item column 200. Since the outlet 210 of the item column 200 is shielded, the items in the item column 200 cannot be delivered out through the outlet 210 of the item column 200 but abut against each other. After the items in the item column 200 abut against each other, the total length of all items in the item column 200 may be detected. And a more accurate total length of all items in the item column 200 can be obtained, so the quantity of items in the item column 200 calculated by the total length of all items in the item column 200 can also be more accurate.

In summary, the beneficial effects of the method for detecting the quantity of items and the vending machine in the embodiments of the present application are as follows:

When the method for detecting the quantity of items provided in the embodiments of the present application is applied to the detection of the quantity of items in the item column in the vending machine, the outlet of the item column is shielded first, and then the driving device in the item column is used for driving the items in the item column to move toward the outlet of the item column. Because the outlet of the item column is shielded, the items in the item column cannot be delivered out through the outlet of the item column, which promotes the items in the item column to abut against each other, that is, avoiding gaps existing between the items when the quantity of items in the item column is detected. When the items in the item column abut against each other, the total length of all items in the item column is measured, and then the quantity of items in the item column is calculated according to the total length of all items and the length of the single item. In this way, the accuracy of detecting the total length of all items in the item column is improved, thereby improving the accuracy of detecting quantity of items in the item column.

What is claimed is:

1. A method for detecting quantity of items, applied to a vending machine,
    wherein the vending machine comprises:
        an item column configured to temporarily store items, wherein the item column comprises an outlet;
        a shielding member configured to shield or open the outlet of the item column; and
        a driving device configured to drive the items in the item column to move toward the outlet of the item column;
    wherein the method comprises:
        controlling the shielding member to shield the outlet of the item column;
        driving the items in the item column to move until the items in the item column abut against each other;
        detecting a total length of all items in the item column; and
        calculating quantity of the all items in the item column according to the total length of the all items and a length of a single item in the item column;
    wherein the driving the items in the item column to move until the items in the item column abut against each other comprises:
        controlling a push plate of the driving device to push the items in the item column to move toward the outlet of the item column; during the push plate pushing the items in the item column to move, detecting whether or not the items in the item column abut against each other; and in response to detecting that the items in the item column abut against each other, controlling the push plate to stop pushing the items in the item column to move;
    wherein the during the push plate pushing the items in the item column to move, detecting whether or not the items in the item column abut against each other comprises:
        detecting a value of a pressure on the push plate or the shielding member; and in response to the value of the pressure on the push plate or the shielding member reaching a preset pressure value, determining that the items in the item column abut against each other;
        or,
        detecting a displacement of the push plate moving in the item column; and in response to the displacement no longer changing, determining that the items in the item column abut against each other;
        or,
        detecting a distance between the push plate and the shielding member; and in response to the distance between the push plate and the shielding member no longer changing, determining that the items in the item column abut against each other.

2. The method for detecting quantity of items of claim 1, wherein the controlling the shielding member to shield the outlet of the item column comprises:
    controlling the shielding member arranged at the outlet of the item column to shield the outlet of the item column.

3. The method for detecting quantity of items of claim 1, wherein the controlling the shielding member to shield the outlet of the item column comprises:
    driving a hopper to the outlet of the item column; and controlling the shielding member arranged on the hopper to shield the outlet of the item column, wherein the hopper is configured to deliver the items discharged from the outlet of the item column.

4. The method for detecting quantity of items of claim 1, wherein the detecting the total length of the all items in the item column comprises:
    detecting the total length of the all items in the item column through a distance measuring sensor, wherein the distance measuring sensor is arranged at one of the following positions: the shielding member, the push plate, or the outlet of the item column.

5. The method for detecting quantity of items of claim 1, wherein the detecting the total length of the all items in the item column comprises:
    driving a hopper to the outlet of the item column; and detecting the total length of the all items in the item column through a distance measuring sensor arranged on the hopper, wherein the hopper is configured to deliver the items discharged from the outlet of the item column.

6. A vending machine, comprising:
    an item column, a driving device, a shielding member, a shielding member driving mechanism, a length measuring device and a control device; wherein:
    the item column is configured to temporarily store items, and the item column comprises an outlet;
    the driving device is configured to drive the items in the item column to move toward the outlet of the item column;
    the shielding member is configured to open or shield the outlet of the item column;
    the shielding member driving mechanism is configured to drive the shielding member to move;
    the length measuring device is configured to detect a total length of the items in the item column; and
    the driving device, the shielding member driving mechanism and the length measuring device are all electrically connected to the control device, and the control device is configured to control the shielding member driving mechanism so as to drive the shielding member to shield the outlet of the item column, control the driving device so as to drive the items in the item column to move until the items in the item column abut against each other, detect the total length of all items in the item column through the length measuring device, and calculate quantity of the all items in the item column according to the total length of the all items and a length of a single item in the item column;
    wherein the driving device comprises a push plate, the push plate is configured to push the items in the item column to move toward the outlet of the item column, and
    the control device is further configured to control the push plate to push the items in the item column to move toward the outlet of the item column, detect whether or not the items in the item column abut against each other during the push plate pushing the items in the item column to move, and control the push plate to stop pushing the items in the item column to move in response to detecting that the items in the item column abut against each other;

wherein the vending machine further comprises a pressure sensor arranged on the push plate or the shielding member, wherein the control device is further configured to detect a value of a pressure on the push plate or the shielding member during the push plate being controlled to push the items in the item column to move toward the outlet of the item column, and determine that the items in the item column abut against each other in response to the value of the pressure on the push plate or the shielding member reaching a preset pressure value;

or, the vending machine further comprises a displacement sensor arranged on the push plate, wherein the control device is further configured to detect a displacement of the push plate during the push plate being controlled to push the items in the item column to move toward the outlet of the item column, and determine that the items in the item column abut against each other in a case where the displacement of the push plate no longer changes;

or, the vending machine further comprises a first distance measuring sensor arranged on the push plate or the shielding member, wherein the control device is further configured to detect a distance between the push plate and the shielding member through the first distance measuring sensor during the push plate being controlled to push the items in the item column to move toward the outlet of the item column, and determine that the items in the item column abut against each other in a case where the distance between the push plate and the shielding member no longer changes.

7. The vending machine of claim 6, wherein the shielding member is arranged on the item column.

8. The vending machine of claim 6, further comprising a hopper and a hopper driving mechanism, wherein the hopper is configured to deliver the items discharged from the outlet of the item column, the hopper driving mechanism is configured to drive the hopper to move, the hopper driving mechanism is electrically connected to the control device, the shielding member is arranged on the hopper, and the control device is further configured to control the hopper driving mechanism so as to drive the hopper to move to the item column before controlling the shielding member driving mechanism to drive the shielding member to shield the outlet of the item column.

9. The vending machine of claim 6, wherein the length measuring device comprises a second distance measuring sensor, and the control device is configured to detect the total length of the all items in the item column through the second distance measuring sensor, wherein the second distance measuring sensor is arranged at one of the following positions: the shielding member, the push plate or the outlet of the item column.

10. The vending machine of claim 6, further comprising a hopper and a hopper driving mechanism, wherein the hopper is configured to deliver the items discharged from the outlet of the item column, the hopper driving mechanism is configured to drive the hopper to move, the hopper driving mechanism is electrically connected to the control device, the length measuring device comprises a second distance measuring sensor arranged on the hopper, the control device is configured to detect the total length of the all items in the item column through the second distance measuring sensor, and the control device is further configured to control the hopper driving mechanism so as to drive the hopper to move to the item column before detecting the total length of the all items in the item column through the second distance measuring sensor.

* * * * *